United States Patent
Li et al.

(10) Patent No.: US 12,265,904 B2
(45) Date of Patent: Apr. 1, 2025

(54) APPARATUS AND METHOD FOR NEURAL NETWORK COMPUTATION

(71) Applicant: Industrial Technology Research Institute, Hsinchu (TW)

(72) Inventors: Sih-Han Li, New Taipei (TW); Shih-Chieh Chang, Hsinchu (TW); Shyh-Shyuan Sheu, Hsinchu County (TW); Jian-Wei Su, Hsinchu (TW); Fu-Cheng Tsai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 917 days.

(21) Appl. No.: 17/131,783

(22) Filed: Dec. 23, 2020

(65) Prior Publication Data

US 2021/0192327 A1 Jun. 24, 2021

Related U.S. Application Data

(60) Provisional application No. 62/953,207, filed on Dec. 24, 2019.

(51) Int. Cl.
G06N 3/063 (2023.01)
G06N 3/045 (2023.01)
G06N 3/0455 (2023.01)

(52) U.S. Cl.
CPC .............. G06N 3/063 (2013.01); G06N 3/045 (2023.01); *G06N 3/0455* (2023.01)

(58) Field of Classification Search
CPC .......... G06N 3/063; G06N 3/045; G06N 3/08; G06N 3/0455
See application file for complete search history.

(56) References Cited

U.S. PATENT DOCUMENTS

| | | |
|---|---|---|
| 4,904,881 A | 2/1990 | Castro |
| 5,097,141 A | 3/1992 | Leivian et al. |

(Continued)

FOREIGN PATENT DOCUMENTS

| | | |
|---|---|---|
| CN | 105095965 | 11/2017 |
| CN | 108805270 | 11/2018 |

(Continued)

OTHER PUBLICATIONS

Lee et al, "Dual-Memory Deep Learning Architectures for Lifelong Learning of Everyday Human Behaviors", Proceedings of the Twenty-Fifth International Joint Conference on Artificial Intelligence (IJCAI-16) (2016). (Year: 2016).*

(Continued)

*Primary Examiner* — Alan Chen
(74) *Attorney, Agent, or Firm* — JCIPRNET (57) ABSTRACT

An apparatus and a method for neural network computation are provided. The apparatus for neural network computation includes a first neuron circuit and a second neuron circuit. The first neuron circuit is configured to execute a neural network computation of at least one computing layer with a fixed feature pattern in a neural network algorithm. The second neuron circuit is configured to execute the neural network computation of at least one computing layer with an unfixed feature pattern in the neural network algorithm. The performance of the first neuron circuit is greater than that of the second neuron circuit.

18 Claims, 6 Drawing Sheets

(56) References Cited

U.S. PATENT DOCUMENTS

| | | | |
|---|---|---|---|
| 10,360,971 B1* | 7/2019 | Hokenmaier | G06N 3/063 |
| 10,763,861 B2 | 9/2020 | Zhang et al. | |
| 2008/0172349 A1 | 7/2008 | Prokhorov | |
| 2015/0286924 A1 | 10/2015 | Arthur et al. | |
| 2017/0200078 A1* | 7/2017 | Bichler | G06N 3/045 |
| 2017/0316312 A1 | 11/2017 | Goyal et al. | |
| 2018/0330238 A1* | 11/2018 | Luciw | G06F 18/2413 |
| 2019/0080231 A1 | 3/2019 | Nestler et al. | |
| 2019/0114170 A1 | 4/2019 | Zhang | |

FOREIGN PATENT DOCUMENTS

| | | |
|---|---|---|
| CN | 109800879 | 5/2019 |
| CN | 109816026 | 5/2019 |
| CN | 110543933 | 12/2019 |
| JP | H0644376 | 2/1994 |
| JP | H0822446 | 1/1996 |
| JP | 2001196920 | 7/2001 |
| JP | 2015215837 | 12/2015 |
| JP | 2018026040 | 2/2018 |
| JP | 2018133016 | 8/2018 |
| JP | 2019159889 | 9/2019 |
| JP | 2019191930 | 10/2019 |
| TW | 454107 | 9/2014 |
| WO | 2014060001 | 4/2014 |
| WO | 2018135516 | 7/2018 |
| WO | 2018208939 | 11/2018 |

OTHER PUBLICATIONS

Panda et al., "FALCON: Feature Driven Selective Classification for Energy-Efficient Image Recognition", IEEE. (Year: 2017).*

"Office Action of Japan Counterpart Application", issued on Oct. 11, 2022, p. 1-p. 4.

"Office Action of Japan Counterpart Application", issued on Mar. 8, 2022, p. 1-p. 3.

Office Action of Taiwan Counterpart Application, issued on Dec. 8, 2021, pp. 1-7.

Win-San Khwa et al., "A 65nm 4Kb Algorithm-Dependent Computing-in-Memory SRAM Unit-Macro with 2.3ns and 55.8TOPS/W Fully Parallel Product-Sum Operation for Binary DNN Edge Processors", 2018 IEEE International Solid-State Circuits Conference, Feb. 14, 2018, pp. 496-498.

Xin Si et al., "A Twin-8T SRAM Computation-In-Memory Macro for Multiple-Bit CNN-Based Machine Learning", 2019 IEEE International Solid-State Circuits Conference, Feb. 20, 2019, pp. 396-398.

Cheng-Xin Xue et al., "A 1Mb Multibit ReRAM Computing-In-Memory Macro with 14.6ns Parallel MAC Computing Time for CNN-Based AI Edge Processors", 2019 IEEE International Solid-State Circuits Conference, Feb. 20, 2019, pp. 388-390.

"Office Action of China Counterpart Application", issued on Dec. 28, 2023, p. 1-p. 7.

* cited by examiner

APPARATUS AND METHOD FOR NEURAL NETWORK COMPUTATION

CROSS-REFERENCE TO RELATED APPLICATION

This application claims the priority benefit of U.S. Provisional Application No. 62/953,207, filed on Dec. 24, 2019. The entirety of the above-mentioned patent application is hereby incorporated by reference herein and made a part of this specification.

BACKGROUND

Technical Field

The disclosure relates to an apparatus and a method for computation, and particularly relates to an apparatus and a method for neural network computation.

Description of Related Art

In life nowadays, artificial intelligence (AI) is widely used in different technical fields to achieve applications, such as identification, warning, operation assistance, etc. However, due to rapid development of AI, various new types of networks have been proposed, and the demand for hardware performance also grows higher continuously. In order to meet the needs of AI development, high-efficiency AI computation hardware becomes a main developmental target.

Furthermore, the AI computation hardware is mainly implemented through a Von Neumann structure, which mainly uses a memory to store weight values, and uses a processing unit to process input signals and access the weight values stored in the memory to generate a computation result to implement neuron computation. However, since the processing unit needs to access the weight information in the memory to perform computations, it consumes a lot of power and causes computation delays, and the Von Neumann structure faces a Von Neumann Bottleneck, which further limits the power consumption and computing speed of the neuron hardware.

SUMMARY

An embodiment of the disclosure provides an apparatus for neural network computation including a first neuron circuit and a second neuron circuit. The first neuron circuit is configured to execute a neural network computation of at least one computing layer with a fixed feature pattern in a neural network algorithm. The second neuron circuit is configured to execute the neural network computation of at least one computing layer with an unfixed feature pattern in the neural network algorithm. The performance of the first neuron circuit is greater than that of the second neuron circuit.

An embodiment of the disclosure provides a method for neural network computation, which is adapted for an apparatus for neural network computation inbuilt with a first neuron circuit and a second neuron circuit, wherein the performance of the first neuron circuit is greater than that of the second neuron circuit. The method includes following steps: executing by the first neuron circuit a neural network computation of at least one computing layer with a fixed feature pattern in a neural network algorithm; and executing by the second neuron circuit the neural network computation of at least one computing layer with an unfixed feature pattern in the neural network algorithm.

To make the aforementioned more comprehensible, several embodiments accompanied with drawings are described in detail as follows.

DESCRIPTION OF THE EMBODIMENTS

The disclosed embodiments provide an apparatus for neural network computation that implements domain-specific artificial intelligence (AI) in a semiconductor manufacturing process. Based on methods of computing in memory (CIM) and transfer learning, the embodiment of the disclosure uses a neuron circuit with high performance to execute a neural network computation of specific computing layers with a fixed feature pattern (for example, a structure and weights do not need to be updated) in a neural network, and uses a neuron circuit with low performance but higher flexibility to execute the neural network computation of the other computing layers with an unfixed feature pattern (for example, the structure and weights need to be updated) in the neural network. In this way, the neural network may be used to implement recognition of signals such as images/sounds in edge devices with limited computing resources.

Figure 1:
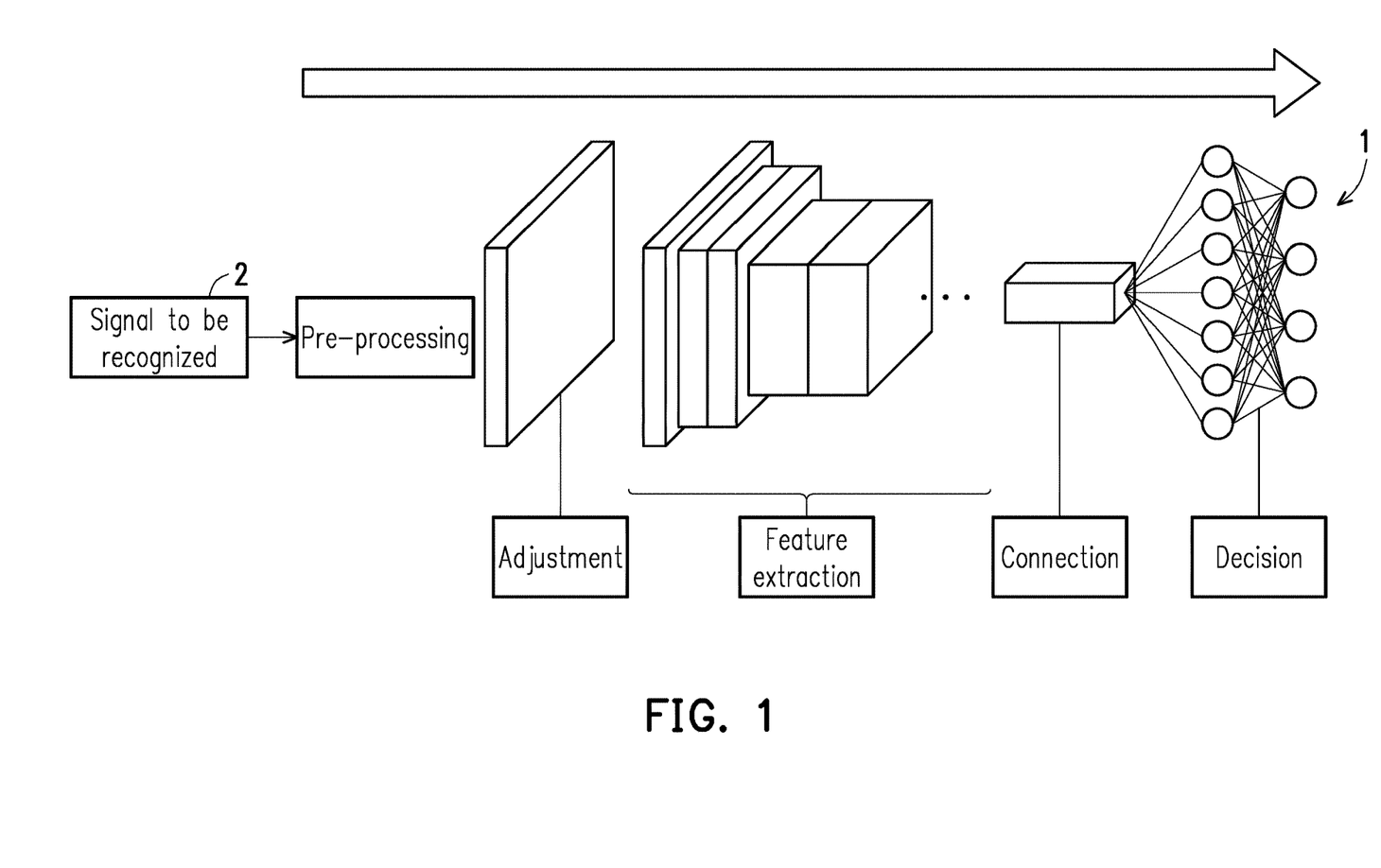
FIG. 1 is a schematic diagram of a neural network framework according to an embodiment of the disclosure.

FIG. 1 is a schematic diagram of a neural network framework according to an embodiment of the disclosure. Referring to FIG. 1, a neural network 1 of the embodiment is, for example, a convolution neural network (CNN). Processing performed on a signal to be recognized 2 by the convolution neural network is divided into a plurality of phases such as a pre-processing phase, an adjustment phase, a feature extraction phase, a connection phase, a decision phase, etc., according to different functions. The signal to be recognized 2 is, for example, a sensing signal sensed by audio and video sensors. In the pre-processing phase, a pre-processing circuit is, for example, used to perform pre-process, such as signal amplifying, filtering, noise suppression, compensation, digital-analog conversion, analog feature extraction, etc., to generate inputs of the neural network 1.

In the adjustment phase, the neural network 1, for example, uses various adaptation techniques to adjust or reduce a feature change to make it suitable for subsequent feature extraction.

In the feature extraction phase, the neural network 1, for example, uses a feature extractor composed of a plurality of convolution layers and pooling layers to perform feature extraction on the adjusted input data. The convolution layers are, for example, to move different convolution kernels on an input image composed of a plurality of inputs to perform convolution computations to obtain a set of feature maps. The pooling layers are, for example, to use a nonlinear pooling function to downsample the input image to reduce the number of parameters and an amount of computations. In some embodiments, the pooling layers may also reduce sensitivity of the convolution layers on edges of objects.

In the first few layers of feature extraction, the neural network 1, for example, uses fixed feature patterns such as points, lines, circles, or polygons to capture features of the input data, and these features are usually not specific to the object to be recognized, but may be used as a basis for subsequent extraction of specific features of the object to be recognized. Taking face recognition as an example, by capturing simple features such as lines, contours, or shapes in the face first, it facilitates subsequent feature extraction of specific parts such as eyes, nose, mouth, etc.

In the connection phase, the neural network 1, for example, connects a classifier composed of one or a plurality of fully connected layers with the previous layer of computing layer (for example, the last layer of convolution layer of the feature extractor) to receive weights of all features extracted by the aforementioned feature extractor to perform subsequent classification.

In the decision phase, the neural network 1 is, for example, a classifier composed of the aforementioned fully connected layers. For the weights of the features received in the connection phase, a non-linear function such as a softmax function is used to calculate a probability of an individual feature (an output of each feature is between 0 and 1, and a sum of the outputs is 1), and finally an output layer determines and outputs a final recognition result through voting according to the probability of each of the features calculated by the classifier. The recognition result is, for example, a probability that the signal to be recognized 2 belongs to each classification, which indicates the classification (for example, the one with the highest probability) that the signal to be recognized 2 belongs to.

Figure 2:
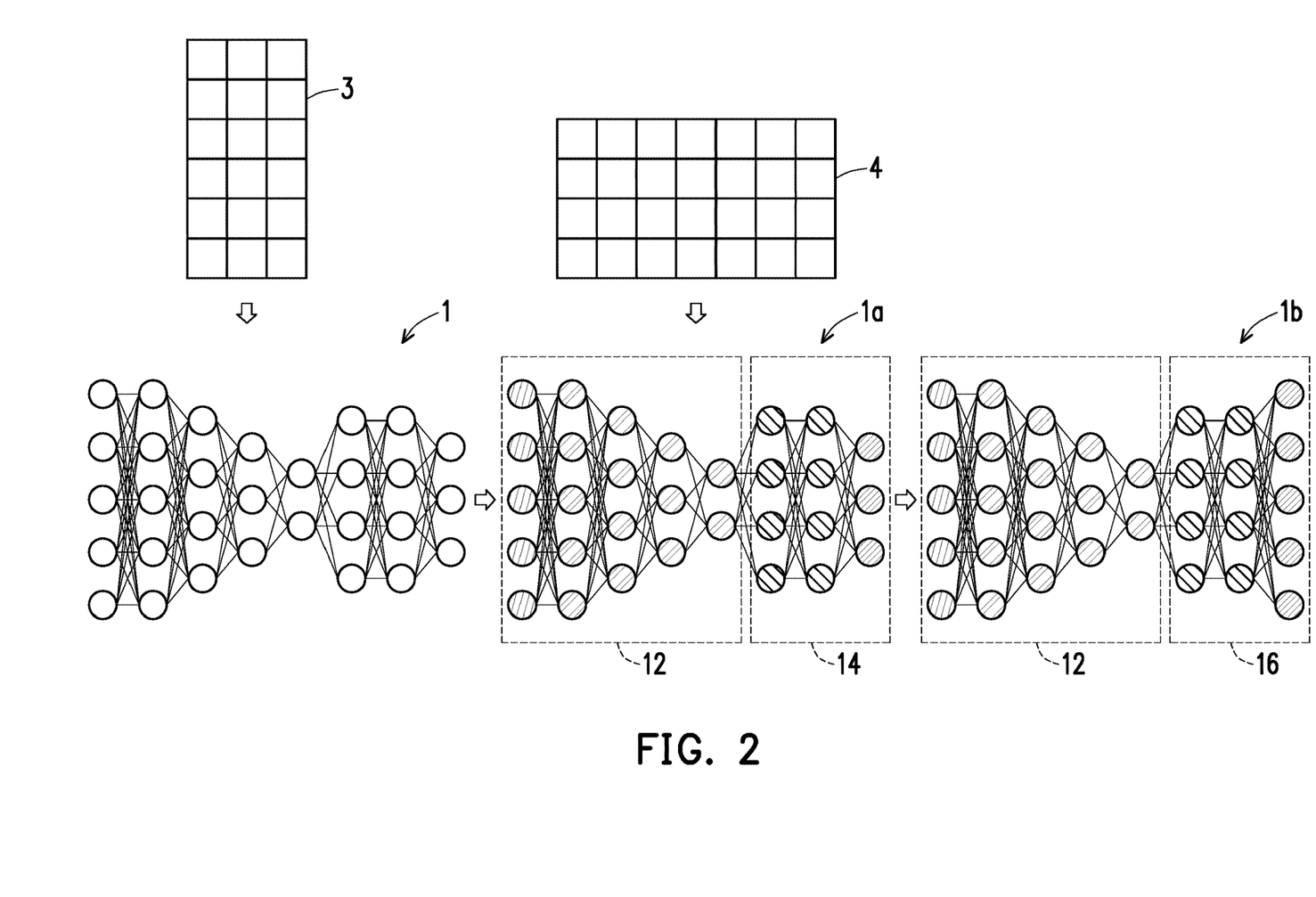
FIG. 2 is a schematic diagram of transfer learning of a neural network according to an embodiment of the disclosure.

FIG. 2 is a schematic diagram of transfer learning of a neural network according to an embodiment of the disclosure. Referring to FIG. 2, in the embodiment, the neural network 1 in FIG. 1 is taken as an example to describe the concept of transfer learning.

First, according to the type of the input data and the classification of the signal to be recognized, a computing layer framework (which, for example, includes an input layer applied to the adjustment phase, a plurality of hidden layers applied to the feature extraction phase, the connection phase, and the decision phase, and an output layer used for outputting the result of the decision phase) of the neural network 1 is determined, so as to build the neural network 1, and generate weights of a plurality of nodes in each computing layer in a random manner.

Then, a plurality of images obtained from an image recognition database (such as ImageNet) and the corresponding classification results are sent to the neural network 1 to serve as training data 3 for training, so as to obtain a trained neural network 1a, where the weights of the nodes in each computing layer have been updated by learning the training data 3. The plurality of computing layers of the neural network 1a may be divided into a computing layer set 12 used for performing neural network computations of fixed feature patterns and a computing layer set 14 used for performing neural network computations of unfixed feature patterns based on the calculated feature patterns.

Then, new training data 4 and new classifications are input to the neural network 1a to retrain the neural network 1a to generate a new neural network 1b. During the training process, based on that the feature patterns identified by each computing layer in the computing layer set 12 are fixed, there is no need to update the weights of the nodes therein, and the structure adjustment and/or weight update are only performed to the computing layers in the computing layer set 14. For example, in the neural network 1b, corresponding to the new classification, the number of nodes of the output layer in the adjusted computing layer set 16 is increased from 3 to 5, and the weights of the nodes of each computing layer will also be updated by learning the new training data 4.

Taking recognition of an animal image as an example, the input of the input layer is all pixel points of a pattern, and the first layer of convolution layer determines the most basic graphics, such as horizontal lines, straight lines, circles, etc. The second layer determines slightly more complicated graphics, such as polygons, and the third layer determines more complicated graphics, and so on. Therefore, the feature recognition in the first few layers has no direct relationship with the target to be recognized, and regardless of recognizing cats, dogs, birds, elephants, and tigers, they are not pixel-level tiny graphics. However, the first few layers are also extremely important, since no matter what the graphics are, they are all made up by pixel-level graphics. Therefore, in the embodiment of the disclosure, by keeping the first few layers, replacing or updating the latter few layers, an retraining the parameters of the model, a new model meeting the needs is obtained. Since the new model only requires training the latter few layers, the computed parameters are less, and a problem of over-fitting is less likely to occur.

Figure 3:
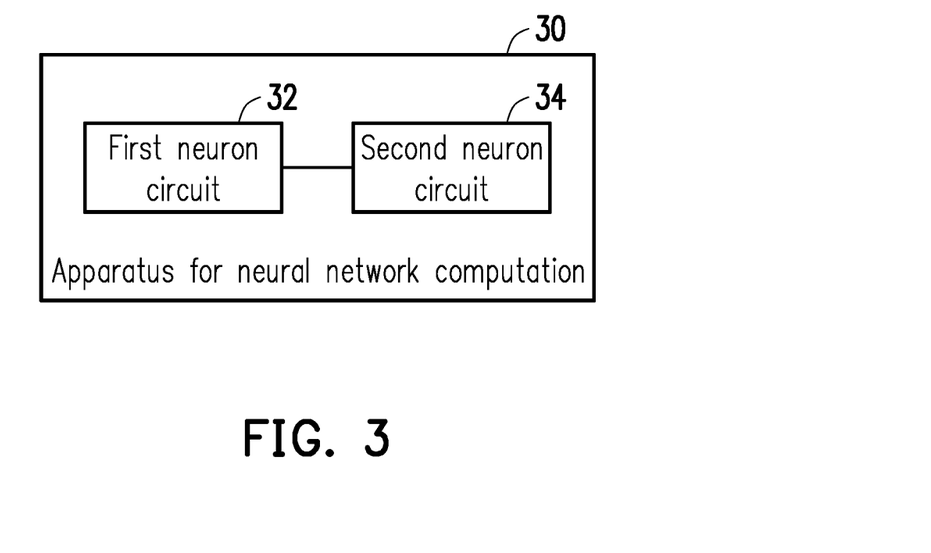
FIG. 3 is a block diagram of an apparatus for neural network computation according to an embodiment of the disclosure.

Based on the aforementioned neural network framework, the embodiment of the disclosure provides a framework of an apparatus for neural network computation based on computing in memory (CIM). FIG. 3 is a block diagram of an apparatus for neural network computation according to an embodiment of the disclosure. Referring to FIG. 3, the apparatus for neural network computation 30 of the embodiment is, for example, a neural network accelerator using a resistive memory framework, or a processing engine (PE) in the accelerator, which is applied to deep learning (DL) to assist a processor (such as a central processing unit) to perform neural network computations. The neural network computation is, for example, a multiply accumulate (MAC) computation.

The apparatus for neural network computation 30 includes a first neuron circuit 32 and a second neuron circuit 34, and the performance of the first neuron circuit 32 is greater than that of the second neuron circuit 34. In some embodiments, the first neuron circuit 32 is a one-time programming (OTP) memory, such as a read only memory (ROM) or an electronic fuse (Efuse) memory. The second neuron circuit 34 is a multi-time programming (MTP) memory, such as a static random access memory (SRAM) or a flash memory (Flash). In other embodiments, the first neuron circuit 32 and the second neuron circuit 34 may also be a combination of other types of memories, which is not limited by the disclosure.

In some embodiments, the apparatus for neural network computation 30 further includes a buffer for temporarily storing input and output data, and a computation circuit (not shown) for supporting nonlinear function and pooling function computations, which is not limited by the disclosure.

Figure 4:
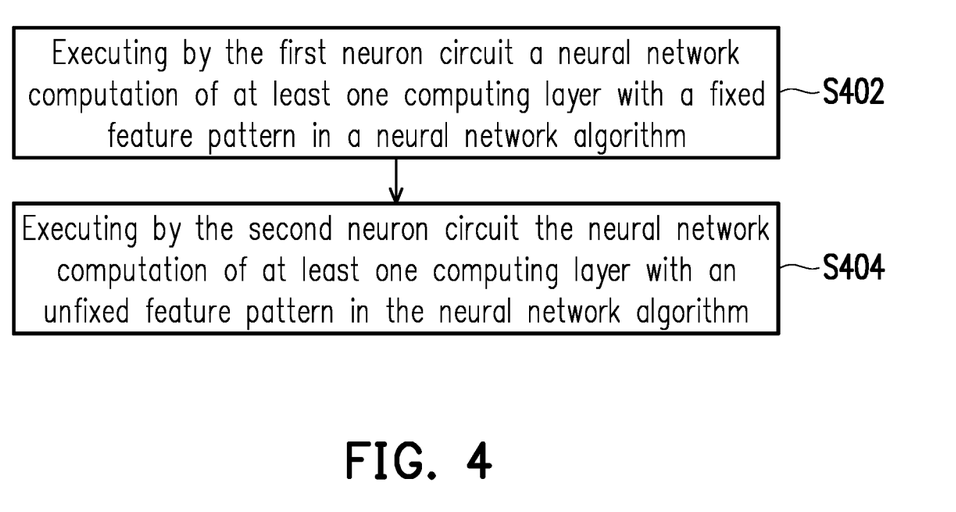
FIG. 4 is a flowchart of a method for neural network computation according to an embodiment of the disclosure.

FIG. 4 is a flowchart of a method for neural network computation according to an embodiment of the disclosure.

Referring to FIG. 3 and FIG. 4 at the same time, the method of the embodiment is adapted for the apparatus for neural network computation 30 of FIG. 3, and detailed steps of the method for neural network computation of the disclosure are introduced below with reference of various components in the apparatus for neural network computation 30.

In step S402, the apparatus for neural network computation 30 uses the first neuron circuit 32 to execute a neural network computation of at least one computing layer with a fixed feature pattern in a neural network algorithm. The above fixed feature pattern includes points, lines, circles, or polygons that are not specific to the object to be recognized, which is not limited by the disclosure. The first neuron circuit 32 is, for example, used to perform computations of the computing layers in charge of feature learning in the neural network algorithm or other computations of the computing layers that are not directly related to the object to be recognized.

In some embodiments, the apparatus for neural network computation 30, for example, first performs pre-process, such as signal amplification, filtering, noise suppression, compensation, analog-digital conversion, analog feature extraction, etc., on the input signal to generate an input of the first neuron circuit 32 (for example, corresponding to the processing in the pre-processing phase of FIG. 1).

In some embodiments, the first neuron circuit 32 adopts a computing in memory (CIM) framework, which includes a plurality of input lines and a plurality of output lines that are arranged in intersection, and a plurality of memory cells respectively arranged at intersections of the input lines and the output lines and storing a plurality of weights of the neural network computation, and a plurality of sense amplifiers respectively connected to the output lines.

Figure 5:
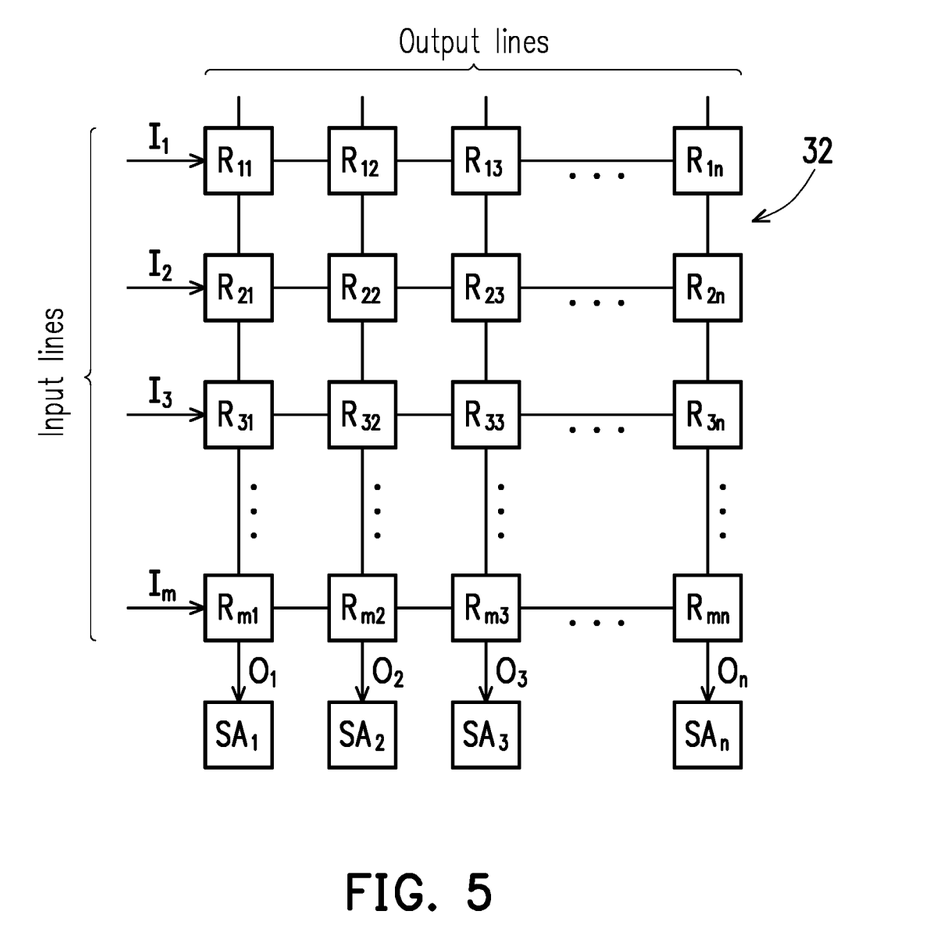
FIG. 5 is a schematic diagram of a neuron circuit according to an embodiment of the disclosure.

FIG. 5 is a schematic diagram of a neuron circuit according to an embodiment of the disclosure. Referring to FIG. 5, in the embodiment, a framework and operations of the first neuron circuit 32 of FIG. 3 are introduced. The first neuron circuit 32 adopts a crossbar array framework, and includes a plurality of input lines and a plurality of output lines arranged in intersection. These input lines and output lines are, for example, word lines and bit lines of a memory circuit, and may be controlled by a column decoder or a row decoder to send inputs $I_1$-$I_m$ of the neural network computation to the input lines, which is not limited by the disclosure.

The memory cells are arranged at each of the intersections of the input lines and the output lines. The memory cell is, for example, a semiconductor element such as a read-only memory (ROM) or an electronic fuse (Efuse), which may store weights (for example, weights $R_{11}$-$R_{mn}$ as shown in the figure, where m and n are positive integers) of the neural network computation through control of the input lines, so as to generate a corresponding output current or an equivalent resistance value when being enabled or turned on.

The memory cells may be divided into n columns and m rows. The memory cells in each row are commonly coupled to an input line to receive the inputs $I_1$-$I_m$ of the neural network computation to control a current magnitude or an equivalent resistance value of the memory cells of such row. Each memory cell, for example, performs a multiplying operation on the input of the connected input line, and outputs a product to the connected output line (for example, the input voltage is under a function of an electrical conductance corresponding to the stored resistance to generate an output current). The memory cells of each column are commonly coupled to an output line, and the output lines accumulate the products output by the connected memory cells to generate outputs $O_1$-$O_n$ (for example, to integrate the current output by each memory cell to generate an output current).

Sense amplifiers $SA_1$-$SA_n$ are respectively connected to the output lines to sense the outputs $O_1$-$O_n$ obtained by the output lines through accumulating the products output by the connected memory cells, for serving as inputs of a next layer of the computing layer.

In some embodiments, the apparatus for neural network computation 30 may, for example, add an adjusting circuit (not shown) capable of adjusting output results between the adjacent computing layers when the first neuron circuit 32 executes the neural network computations of a plurality of computing layers, the adjusting circuit is connected or configured to the sense amplifiers $SA_1$-$SA_n$ respectively, and may be used to adjust gains and biases of the outputs sensed by the sense amplifiers $SA_1$-$SA_n$, so that the adjusted outputs are adapted to serve as the inputs of a next layer of the computing layer.

Figure 6:
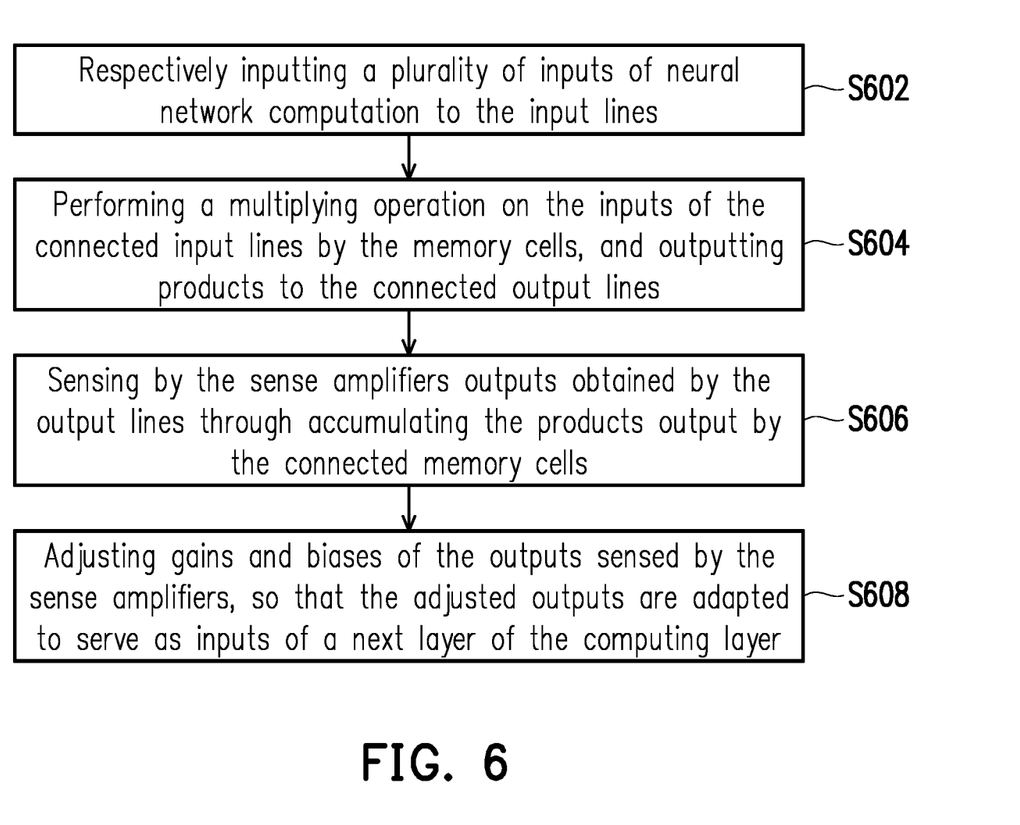
FIG. 6 is a flowchart of a method for neural network computation according to an embodiment of the disclosure.

FIG. 6 is a flowchart of a method for neural network computation according to an embodiment of the disclosure. Referring to FIG. 5 and FIG. 6 at the same time, the method of the embodiment is adapted for the first neuron circuit 32 of FIG. 5, and detailed steps of the method for neural network computation of the disclosure are introduced below with reference of various components in the first neuron circuit 32.

In step S602, the apparatus for neural network computation 30 respectively inputs a plurality of the inputs $I_1$-$I_m$ of the neural network computation to the input lines of the first neuron circuit 32.

In step S604, the memory cells of the first neuron circuit 32 multiply the inputs $I_1$-$I_m$ of the connected input lines, and output the products to the connected output lines.

In step S606, the sense amplifiers $SA_1$-$SA_n$ of the first neuron circuit 32 sense the outputs $O_1$-$O_n$ obtained by the output lines through accumulating the products output by the connected memory cells.

In step S608, the adjusting circuit of the first neuron circuit 32 adjusts the gains and biases of the outputs sensed by the sense amplifiers $SA_1$-$SA_n$, so that the adjusted outputs are suitable to serve as the inputs of a next layer of the computing layer.

By appropriately adjusting the output results to meet the characteristics or requirements of the next layer of the computing layer, better accuracy may be achieved without drastically changing a hardware framework.

Referring back to the flow of FIG. 4, in step S404, the apparatus for neural network computation 30 uses the second neuron circuit 34 to execute the neural network computation of the at least one computing layer with an unfixed feature pattern in the neural network algorithm. Namely, the second neuron circuit 34 is, for example, used to perform computations of the computing layers in charge of classification in the neural network algorithm or other computations of the computing layers that need to be modified due to different recognition objects.

Similar to the first neuron circuit 32, the second neuron circuit 34 also uses a CIM framework (as shown in FIG. 5), but different to the first neuron circuit 32, the memory cells in the second neuron circuit 34 adopt semiconductor components such as static random access memories (SRAM) or flash memories, which have lower performance but higher flexibility compared with the memory cells of the first neuron circuit 32, so that the second neuron circuit 34 may adaptively adjust the framework of the computing layer according to new input data and update the weight values of the nodes in each computing layer.

Figure 7:
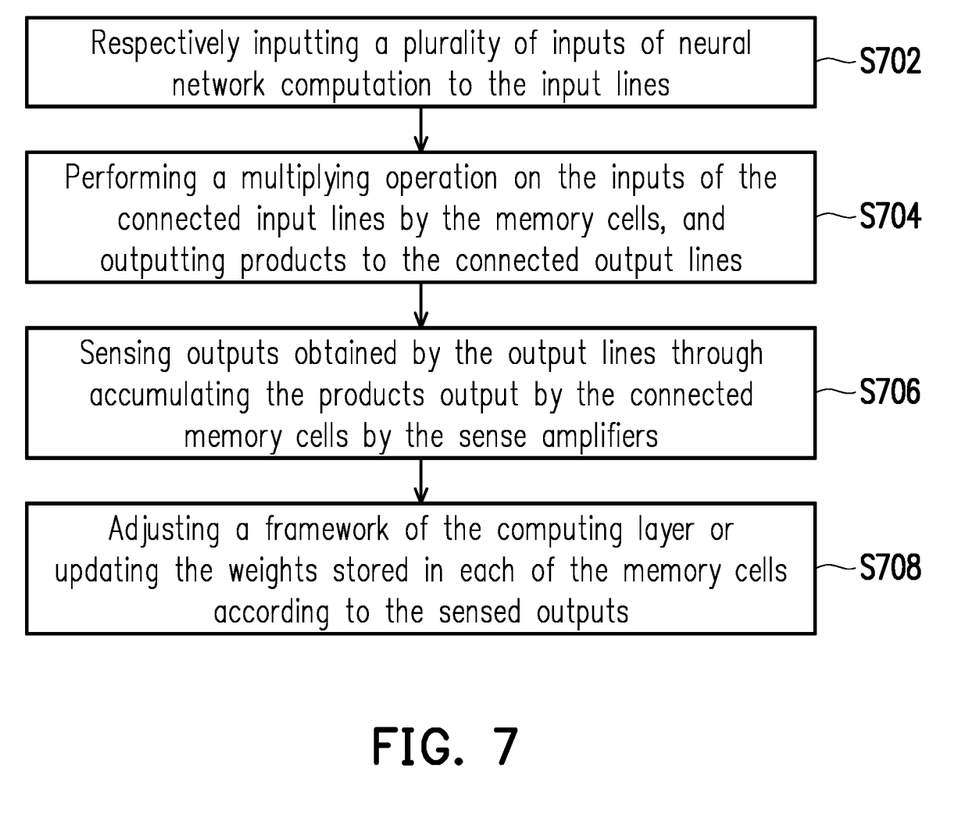
FIG. 7 is a flowchart of a method for neural network computation according to an embodiment of the disclosure.

FIG. 7 is a flowchart of a method for neural network computation according to an embodiment of the disclosure. Referring to FIG. 3 and FIG. 7, the method of the embodiment is adapted for the second neuron circuit 34 of FIG. 3, and the second neuron circuit 34 adopts the framework of the first neuron circuit 32 shown in FIG. 5.

In step S702, the apparatus for neural network computation 30 respectively inputs a plurality of inputs of the neural network computation to the input lines of the second neuron circuit 34.

In step S704, the memory cells of the second neuron circuit 34 multiply the inputs $I_1$-$I_m$ of the connected input lines, and output the products to the connected output lines.

In step S706, the sense amplifiers of the second neuron circuit 34 sense the outputs obtained by the output lines through accumulating the products output by the connected memory cells.

In step S708, the second neuron circuit 34 adjusts the framework of the computing layer or updates the weights stored in each of the memory cells according to the outputs sensed by the sense amplifiers, so that the adjusted computing layer may support new classification computations and has better recognition accuracy.

In some embodiments, the second neuron circuit 34 may perform post-processing such as analog-to-digital conversion, normalization, activation function computation, etc., on the outputs to serve as the inputs of a next layer of the computing layer, which is not limited by the disclosure.

In some embodiments, similar to the first neuron circuit 32, the second neuron circuit 34 may also add an adjusting circuit capable of adjusting the output results between the adjacent computing layers for adjusting gains and biases of the outputs sensed by the sense amplifiers, so that the adjusted outputs are adapted to serve as the inputs of a next layer of the computing layer, so as to implement better accuracy, which is not limited by the disclosure.

In summary, in the apparatus and method for neural network computation of the embodiments of the disclosure, the advantages of computing in memory and transfer learning are combined to divide the neural network into two parts according to the feature patterns of the executed computations, where the neural network computations of the specific computing layers with fixed feature patterns are executed by a neuron circuit with higher performance, and the neural network computations of other computing layers with unfixed feature patterns are executed by a neuron circuit with lower performance and higher flexibility, so as to implement an AI accelerator chip structure with high performance, low cost and certain flexibility, which may be applied to neural network accelerators on terminals (edges) or in the cloud.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An apparatus for neural network computation, comprising:
   a first neuron circuit, including a first computing layer set of a trained neural network;
   a second neuron circuit, including a second computing layer set of the trained neural network;
   a pre-processing circuit, performing pre-processing on analog input signals to generate a plurality of inputs of the first neuron circuit, the pre-processing comprising one of signal amplification, filtering, noise suppression, compensation, digital-to-analog conversion, analog feature extraction, or a combination thereof;
   a processor, coupled to the first neuron circuit and the second neuron circuit, configured to:
   execute a first neural network computation for a fixed feature pattern through the first computing layer set; and
   execute a second neural network computation for an unfixed feature pattern through the second computing layer set, wherein a computing speed of the first neuron circuit is higher than that of the second neuron circuit or a power consumption of the first neuron circuit is lower than that of the second neuron circuit;
   wherein a training process of the trained neural network comprises:
   building a neural network;
   sending training data to the neural network for training, so as to obtain the trained neural network, and dividing the first computing layer set and the second computing layer set in the trained neural network;
   in response to receiving new training data, sending the new training data to the trained neural network obtained by previously training for retraining to generate a new neural network,
   wherein in a process of retraining the trained neural network, an update of a structure and weights of the first computing layer set is not performed, but only an update of at least one of the structure and weights of the second computing layer set is performed.

2. The apparatus for neural network computation as claimed in claim 1, wherein the first neuron circuit is a one-time programming memory, and the second neuron circuit is a multi-time programming memory.

3. The apparatus for neural network computation as claimed in claim 2, wherein the one-time programming memory comprises a read only memory or an electronic fuse memory.

4. The apparatus for neural network computation as claimed in claim 2, wherein the multi-time programming memory comprises a static random access memory or a flash memory.

5. The apparatus for neural network computation as claimed in claim 1, wherein the fixed feature pattern comprises points, lines, circles, or polygons that are not specific to an object to be recognized.

6. The apparatus for neural network computation as claimed in claim 1, wherein the first neuron circuit comprises:
   a plurality of first input lines and a plurality of first output lines arranged in intersection, wherein the first input lines respectively receive a plurality of first inputs of the first neural network computation;
   a plurality of first memory cells, respectively arranged at a plurality of first intersections of the first input lines and the first output lines, storing a plurality of first weights of the first neural network computation for performing a multiplying operation on the first inputs of the connected first input lines, and outputting first products to the connected first output lines; and
   a plurality of first sense amplifiers, respectively connected to the first output lines for sensing first outputs obtained by the first output lines through accumulating the first products output by the connected first memory cells;

wherein the second neuron circuit comprises:
a plurality of second input lines and a plurality of second output lines arranged in intersection, wherein the second input lines respectively receive a plurality of second inputs of the second neural network computation;
a plurality of second memory cells, respectively arranged at a plurality of second intersections of the second input lines and the second output lines, storing a plurality of second weights of the second neural network computation for performing a multiplying operation on the second inputs of the connected second input lines, and outputting second products to the connected second output lines; and
a plurality of second sense amplifiers, respectively connected to the second output lines for sensing second outputs obtained by the second output lines through accumulating the second products output by the connected second memory cells.

7. The apparatus for neural network computation as claimed in claim 6, wherein the first neuron circuit further comprises:
a plurality of first adjusting circuits, respectively connected to or configured in the first sense amplifiers to adjust gains and biases of the first outputs sensed by the first sense amplifiers, so that the first adjusted outputs are adapted to serve as inputs of a next layer of the first computing layer set;
wherein the second neuron circuit further comprises:
a plurality of second adjusting circuits, respectively connected to or configured in the second sense amplifiers to adjust gains and biases of the second outputs sensed by the second sense amplifiers, so that the second adjusted outputs are adapted to serve as inputs of a next layer of the second computing layer set.

8. The apparatus for neural network computation as claimed in claim 1, wherein the first neural network computation and the second neural network computation are multiply-accumulate computations.

9. A method for neural network computation, adapted for an apparatus for neural network computation inbuilt with a processor, a first neuron circuit and a second neuron circuit, wherein a computing speed of the first neuron circuit is higher than that of the second neuron circuit or a power consumption of the first neuron circuit is lower than that of the second neuron circuit, the method comprising:
performing, by the processor, first pre-processing on first analog input signals to generate inputs of the first neuron circuit, wherein the first pre-processing comprises one of signal amplification, filtering, noise suppression, compensation, digital-to-analog conversion, analog feature extraction, or a combination thereof;
executing, by the processor, a first neural network computation for a fixed feature pattern through a first computing layer set of a trained neural network in the first neuron circuit; and
executing, by the processor, a second neural network computation for an unfixed feature pattern through a second computing layer set of the trained neural network in the second neuron circuit;
wherein a training process of the trained neural network comprises:
building a neural network;
sending training data to the neural network for training, so as to obtain the trained neural network, and dividing the first computing layer set and the second computing layer set in the trained neural network;
in response to receiving new training data, sending the new training data to the trained neural network obtained by previously training for retraining to generate a new neural network,
wherein in a process of retraining the trained neural network, an update of a structure and weights of the first computing layer set is not performed, but only an update of at least one of the structure and weights of the second computing layer set is performed.

10. The method as claimed in claim 9, wherein the first neuron circuit comprises a plurality of first input lines and a plurality of first output lines arranged in intersection, a plurality of first memory cells respectively arranged at a plurality of first intersections of the plurality of first input lines and the plurality of first output lines and storing a plurality of first weights of the first neural network computation, and a plurality of first sense amplifiers respectively connected to the first output lines, and executing by the first neuron circuit the first neural network computation of the at least one first computing layer set with the fixed feature pattern in the neural network algorithm comprises:
respectively inputting a plurality of first inputs of the first neural network computation to the first input lines;
performing by the first memory cells a multiplying operation on the first inputs of the connected first input lines, and outputting first products to the connected first output lines; and
sensing by the first sense amplifiers first outputs obtained by the first output lines through accumulating the first products output by the first connected memory cells.

11. The method as claimed in claim 9, wherein after sensing by the first sense amplifiers the first outputs obtained by the first output lines through accumulating the first products output by the connected first memory cells, the method further comprises:
performing first post-processing on the first outputs sensed by the first sense amplifiers to serve as inputs of a next layer of the first computing layer set, wherein the first post-processing comprises one of analog-digital conversion, normalization, and activation function computation, or a combination thereof.

12. The method as claimed in claim 11, wherein the first post-processing further comprises adjusting gains and biases of the first outputs sensed by the first sense amplifiers, so that the adjusted first outputs are adapted to serve as the inputs of the next layer of the first computing layer set.

13. The method as claimed in claim 9, wherein the second neuron circuit comprises a plurality of second input lines and a plurality of second output lines arranged in intersection, a plurality of second memory cells respectively arranged at a plurality of second intersections of the plurality of second input lines and the plurality of second output lines and storing a plurality of second weights of the second neural network computation, and a plurality of second sense amplifiers respectively connected to the second output lines, and executing by the second neuron circuit the second neural network computation of the at least one second computing layer set with the unfixed feature pattern in the neural network algorithm comprises:
respectively inputting a plurality of second inputs of the second neural network computation to the second input lines;
performing by the second memory cells a multiplying operation on the second inputs of the connected second input lines, and outputting second products to the connected second output lines;

sensing by the second sense amplifiers second outputs obtained by the second output lines through accumulating the second products output by the connected second memory cells; and adjusting a framework of the second computing layer set or updating the second weights stored in each of the second memory cells according to the sensed second outputs.

14. The method as claimed in claim 13, wherein after sensing by the second sense amplifiers the second outputs obtained by the second output lines through accumulating the second products output by the connected second memory cells, the method further comprises:

performing second post-processing on the second outputs to serve as inputs of a next layer of the second computing layer set, and the second post-processing comprises one of analog-digital conversion, normalization, and activation function computation, or a combination thereof.

15. The method as claimed in claim 14, wherein the second post-processing further comprises adjusting gains and biases of the second outputs sensed by the second sense amplifiers, so that the adjusted second outputs are adapted to serve as inputs of a next layer of the second computing layer set.

16. The method as claimed in claim 9, wherein the first neuron circuit is a one-time programming memory, and the second neuron circuit is a multi-time programming memory, wherein the one-time programming memory comprises a read only memory or an electronic fuse memory, and the multi-time programming memory comprises a static random access memory or a flash memory.

17. The method as claimed in claim 9, wherein the fixed feature pattern comprises points, lines, circles, or polygons that are not specific to an object to be recognized.

18. The method as claimed in claim 9, wherein the first neural network computation and the second neural network computation are multiply-accumulate computations.

* * * * *